UNITED STATES PATENT OFFICE.

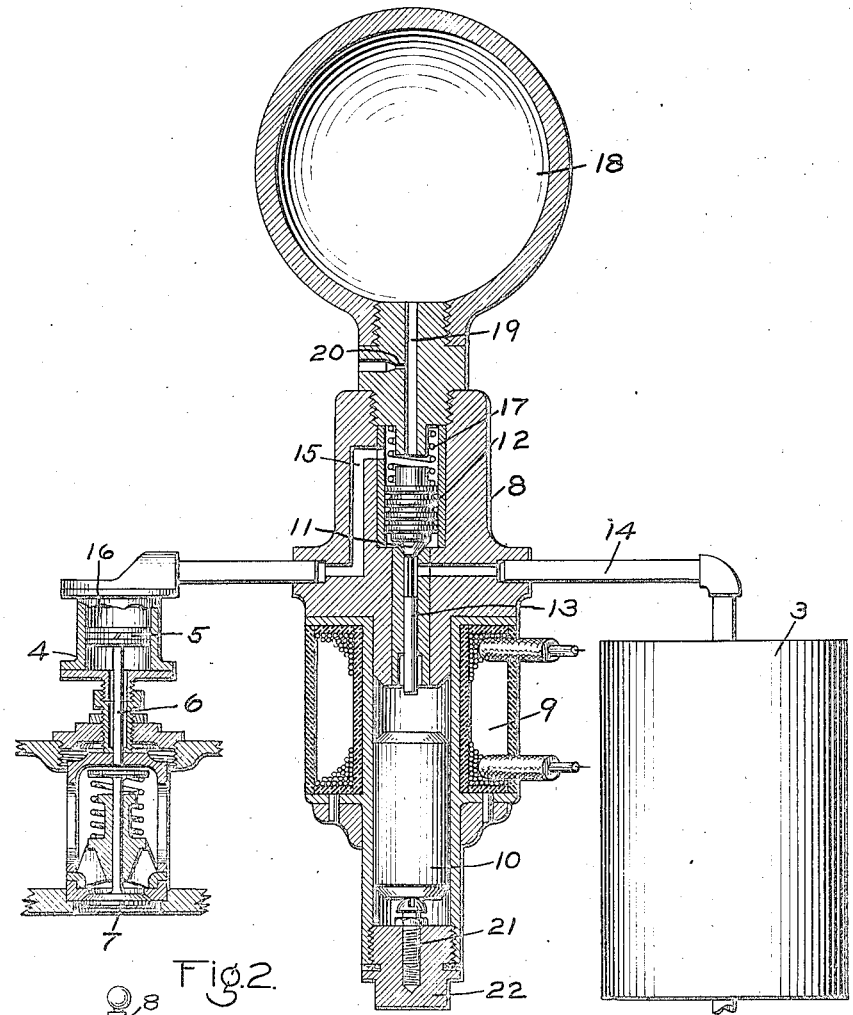
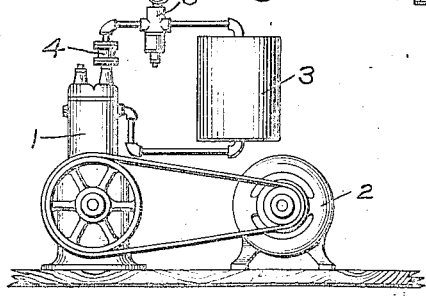

BURTON S. AIKMAN, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

STARTING AND UNLOADING DEVICE FOR COMPRESSORS.

1,412,819.  Specification of Letters Patent.  Patented Apr. 18, 1922.

Application filed August 31, 1920. Serial No. 407,155.

*To all whom it may concern:*

Be it known that I, BURTON S. AIKMAN, a citizen of the United States, residing at Milwaukee, in the county of Milwaukee and State of Wisconsin, have invented new and useful Improvements in Starting and Unloading Devices for Compressors, of which the following is a specification.

This invention relates to apparatus for compressing fluid and more particularly to means for controlling a compressor unloading device for an equipment in which the fluid compressor is driven by an electric motor continually in driving connection with the compressor.

My invention is particularly adapted for use with single phase commutator motors in which at starting, when the current value is high, brushes are employed so as to operate the motor as a repulsion motor and when the normal running speed of the motor is reached, the connections are changed, so that the motor thereafter runs as an induction motor.

The principal object of my invention is to provide means for controlling the unloading of the compressor at starting and when the current flow to the motor is excessive.

In the accompanying drawing, Fig. 1 is a sectional view of a compressor unloading device embodying my invention; and Fig. 2 a diagrammatic view of a fluid compressing equipment with the improved unloading device applied thereto.

As shown in Fig. 2 of the drawing, the apparatus may comprise a fluid compressor 1, in continual driving connection with an electric motor 2, and adapted to compress fluid under pressure into a storage reservoir 3.

Associated with the compressor 1, is an unloading device comprising a cylinder 4, containing a piston 5 having a stem 6 for operating the suction or inlet valve 7 of the compressor.

For operating the unloading device, an electrically controlled mechanism 8 is provided, comprising a magnet coil 9 connected in series with the windings of the compressor motor 2 and having an armature 10.

In alinement with the armature 10 is a valve 11 carried by a loosely fitted piston 12 subject to the pressure of a spring 17 and having a stem 13 which is adapted to be engaged by the armature 10. The valve 11 controls communication from a pipe 14, leading to the storage reservoir 3, to a passage and pipe 15, leading to the piston chamber 16 of the unloading device.

A volume chamber 18 is connected by passage 19 to passage 15, the passage 19 being provided with a restricted exhaust port 20.

The armature 10 is provided with means for adjusting the air gap between the stem 13 and the top of the armature, such as a screw 21, having its head adapted to engage the under side of the armature and having screw-threaded engagement in the cap 22.

In operation, the air gap between the armature and the valve stem 13 is adjusted so as to require a current flow in the coil 9 of a certain desired amount in excess of the full speed current flow of the motor in order to operate the armature, for example, a current value of one and one-half times full load current.

When the motor circuit is closed, the starting current will be high and sufficient to cause the armature 10 to be moved to its full upward position. The stem 13 is thus actuated by the armature to open the valve 11, so that fluid under pressure from the reservoir 3 is supplied from pipe 14, past the valve 11 and around the loose fitting piston 12 to passage 15 and the piston chamber 16 of the unloading device. The piston 5 is then operated by fluid under pressure to open the suction valve 7 of the compressor, so that the compressor will run without load.

In its upper position, the piston 12 seats, so as to cut off communication from passage 15 to the exhaust port 20 and the chamber 18, so that only the small volume of the piston chamber 16 has to be supplied with fluid from the reservoir 3 and consequently the piston 5 will be actuated also simultaneously with the opening of the valve 11, thus causing the prompt unloading of the compressor.

When the pressure in the reservoir 3 has substantially equalized into the piston chamber 16, the piston 12 will be moved slightly from its upper seat by the action of spring 17, so that the pressure in piston chamber 16 and above piston 12 tends to reduce by flow of fluid through the port 20 and into the chamber 18. This reduction in fluid pressure above the piston 12 prevents the piston and the valve 11 from moving to closed position, even though the armature 10 may have dropped by this time.

The valve 11 will now remain open until the chamber 18 has been charged with fluid under pressure to a certain degree, when the piston 12 will operate to close the valve 11.

When the valve 11 closes, fluid under pressure in piston chamber 16 and in the chamber 18 escapes to the atmosphere through restricted port 20, permitting the piston 5 to move upwardly and the inlet valve 7 to close.

Since it requires less current in the coil 9 to hold the armature 10 in its upper position than is required to move same to that position, the armature will not drop until the current value has been reduced to a considerable extent, for example, if it requires a current value of one and one-half times the full load current to move the armature from its lower position, the armature may be held in its upper position until the current value falls to about three-quarters of the full load current and until this lower current value is reached, the pneumatic timing feature will not of course come into action.

Since the pneumatic timing action takes place after the armature 10 has dropped, the compressor remains unloaded for a time which fully ensures that the brushes of the motor will be shifted for running the motor as an induction motor before the compressor is loaded.

If, during the running of the compressor, the current value should rise above a predetermined point, due to the slowing down of the motor on account of line or other conditions, the compressor will be automatically relieved of its load by the operation of the armature 10 as previously described in connection with starting, thus permitting the motor to speed up and preventing the shifting of the brushes so that the motor will continue to operate as an induction motor.

Under the above abnormal conditions, the compressor will be alternately loaded and unloaded, but will operate most of the time in the unloaded state, by reason of the delay introduced by the lagging action of the armature 10 and the pneumatic delay caused by the chamber 18 and the restricted port 20.

The valve 11 and piston 12 also act as a safety valve, since upon an increase in pressure in the reservoir 3 above a predetermined degree, the valve 11 will be lifted against the pressure of spring 17, exposing the full area of the piston 12 to pressure in the reservoir, so that the piston 12 and valve 11 are quickly shifted to their open position, in which fluid under pressure is supplied to the piston cylinder 16 to effect the unloading of the compressor.

It will now be seen that the above described apparatus functions to cause the compressor to operate in an unloaded state until the full running speed is attained, to cause the unloading of the compressor whenever the current value rises to a predetermined degree higher than normal, and to ensure the prompt shifting of the motor brush rigging in changing over from a repulsion to an induction motor, while the compressor is running unloaded.

Having now described my invention, what I claim as new and desire to secure by Letters Patent, is:—

1. The combination with a fluid compressor, an electric motor for driving said compressor, and a compressor unloading device, of electrically controlled means for controlling the operation of said unloading device and responsive to a predetermined rise in current supplied to the motor for effecting the operation of said device to unload the compressor.

2. The combination with a fluid compressor and an electric motor for driving said compressor, of a compressor unloading device, means operated upon a predetermined rise in current to the motor for effecting the operation of said device to unload the compressor, and fluid pressure means for delaying the operation of said device to load the compressor when the current to the motor becomes reduced.

3. The combination with a fluid compressor and an electric motor for driving said compressor, of a compressor unloading device including a piston operated by fluid under pressure, a chamber having a restricted exhaust port, valve means for controlling communication from said piston to said chamber and from a source of fluid pressure to said piston, and means controlled by an abnormal quantity of current to the motor for operating said valve means.

4. The combination with a fluid compressor and an electric motor for driving said compressor, of a compressor unloading device including a piston operated by fluid under pressure, a chamber having a restricted exhaust port, a source of fluid under pressure, valve means having a position for connecting said piston with said chamber, another position for connecting said piston with the source of fluid pressure, and a third position in which fluid under pressure is supplied to said chamber and communication is open from said piston to the chamber, and means controlled by an abnormal quantity of current supplied to the motor for operating said valve means.

5. The combination with a fluid compressor and an electric motor for driving said compressor, of a compressor unloading device including a piston operated by fluid under pressure, a valve device for controlling the supply of fluid under pressure to said piston, means operated upon a predetermined rise in current to the motor for operating said valve device, and a fluid pressure timing means for delaying the movement of said valve device to cut off the supply of fluid under pressure to said piston.

In testimony whereof I have hereunto set my hand.

BURTON S. AIKMAN.